Oct. 12, 1971    A. T. D'ANNESSA ET AL    3,611,787

APPARATUS FOR MINIMIZING THERMAL GRADIENT IN TEST SPECIMENS

Filed June 11, 1969

INVENTORS.
ANTHONY T. D'ANNESSA
HARVARD H. KRANZLEIN, SR.

3,611,787
APPARATUS FOR MINIMIZING THERMAL
GRADIENT IN TEST SPECIMENS
Anthony T. D'Annessa and Harvard H. Kranzlein, Sr.,
Marietta, Ga., assignors to Lockheed Aircraft Corporation, Burbank, Calif.
Filed June 11, 1969, Ser. No. 832,383
Int. Cl. G01n 3/18
U.S. Cl. 73—15.6
3 Claims

ABSTRACT OF THE DISCLOSURE

Apparatus for eliminating or minimizing the thermal gradient which occurs across a test specimen undergoing a tensile test, especially at non-ambient temperatures. A test specimen being evaluated at an elevated temperature may undergo a signicant and undesired thermal gradient throughout a dimension of the specimen, and this thermal gradient can introduce substantial inaccuracies in the test data obtained. A thermal gradient measured along the test specimen is used to control the addition or subtraction of heat from the specimen as necessary to minimize the unwanted thermal gradient.

This invention relates in general to apparatus for testing and in particular to an improved apparatus for testing a specimen at non-ambient temperatures.

The mechanical characteristics of many materials depend on the temperature of the material, and characteristics such as tensile strength, which may be determined at room temperature, are substantially different at the elevated or depressed temperatures more typical of the environment in which the material may be used. For example, aircraft structures designed for operation in the transonic or supersonic speed ranges undergo air friction heating which may raise the exterior temperature of the aircraft as much as or more than several hundred degrees Fahrenheit. The strength of the aircraft structural components which are subjected to this heat obviously must be determined at such elevated temperatures and not merely at room temperature. The same is true of materials intended for use in extremely cold conditions, such as in an arctic environment, where normally ductile materials may become dangerously brittle when subjected to the cold.

It has been found that test specimens which are placed in a non-ambient temperature environment and ostensibly permitted to reach the temperature of that environment may actually exhibit a significant temperature gradient along a dimension of the specimen, and it has been further found that this temperature gradient can introduce significant errors in the characteristic being evaluated. For example, a tensile test specimen placed between the jaws of a conventional tensile testing machine and enclosed in a suitable oven maintained at a nominal test temperature of 800° C. for an elevated temperature can exhibit a temperature differential of 30° C. ranging from the specimen center to an end thereof. Stress-strain curves of a test article exhibiting this temperature differential are significantly different from similar curves of a corresponding test article evaluated according to the present invention, wherein the temperature differential is minimized or eliminated.

Accordingly, it is an object of this invention to provide an improved apparatus for testing.

It is still another object of this invention to provide an improved apparatus for testing a specimen at a non-ambient temperature.

It is another object of this invention to provide apparatus for testing which minimizes a thermal gradient occurring along a test specimen.

A further object of the present invention is to provide apparatus for testing which determines the thermal gradient along a test specimen and adds or removes heat as required to minimize the thermal gradient.

Other objects and many of the attendant advantages of the present invention will be apparent from consideration of the specification and the annexed drawing in which.

The present invention generally includes measuring the temperature at a number of locations on a test specimen to determine whether an unwanted temperature gradient exists. The measured temperature gradient is used to control the amount of heat which is either supplied to or removed from some portion of the test specimen to reduce the unwanted thermal gradient.

Figure 1:
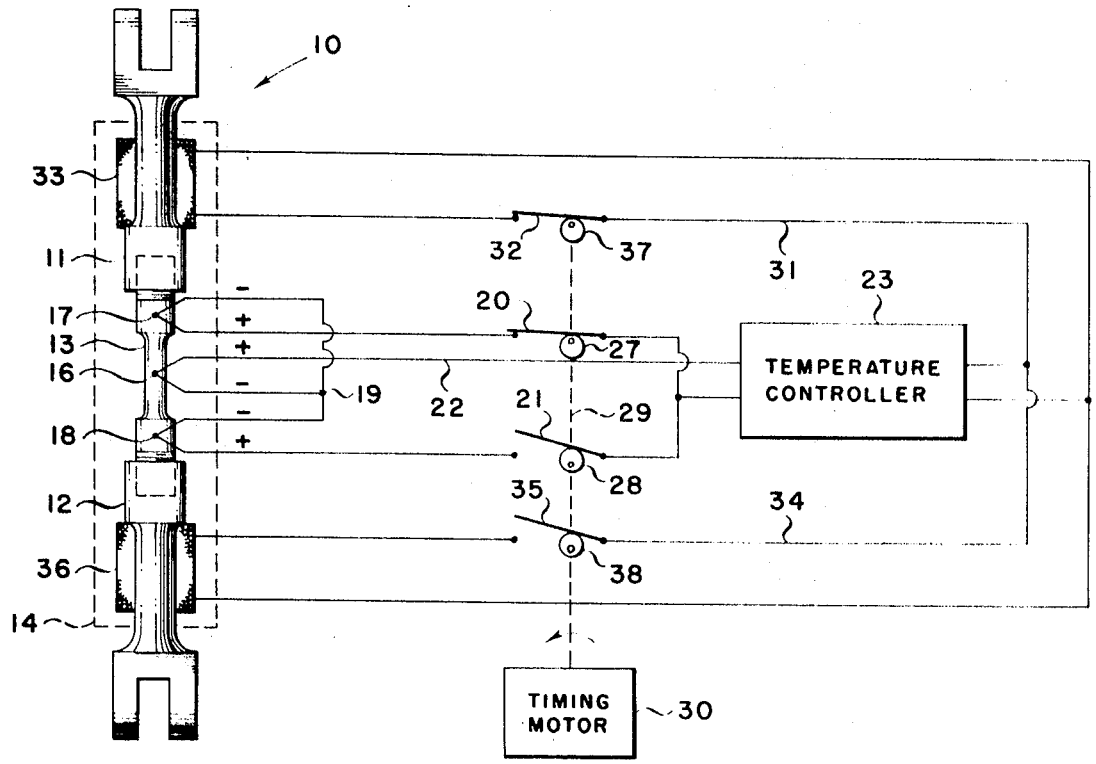
FIG. 1 shows a schematic diagram of an embodiment of the present invention.

Referring to FIG. 1 for a more detailed view of the illustrated embodiment of the invention, there is shown generally at 10 a portion of a conventional tensile testing machine including grips 11 and 12 in which a test specimen 13 is mounted for a tensile test. The machine 10 operates in a manner known to those skilled in the art to apply a tensile force to the test specimen 13 and to indicate or record the amount of force required to cause a measured elongation or the failure of the test specimen. In a test conducted at a non-ambient temperature, the test specimen 13 and at least a portion of each of the grips 11 and 12 would be positioned in a suitable environmental chamber 14 to heat or to cool the test specimen. This desired heating or cooling frequently does not produce a uniform temperature along the entire length of the test specimen 13, however, because the mass of the grips 11 and 12 acts as a heat sink which must also be heated or cooled and which provides a path for unwanted heat flow between the ends of the test specimen and the exterior of the environmental chamber 14.

The thermal gradient along the test specimen 13 is measured in the depicted embodiment by attaching a number of temperature sensing devices such as thermocouples 16, 17, and 18 to the test specimen. Thermocouples 17 and 18 are attached adjacent each of the ends of the test specimen 13 and the thermocouple 16 is attached to the test specimen approximately midway between the other two thermocouples in the depicted embodiment, although other physical arrangements may suggest themselves for use with workpieces having a non-uniform shape or distribution of mass. The thermocouples are polarized as shown in FIG. 1, with all terminals of a given polarity, such as the negative terminals, being connected to a common point 19 and with the respective positive terminals of the end thermocouples 17 and 18 being connected to the terminals of switches 20 and 21. The positive terminal of the midpoint thermocouple 16 is connected by a line 22 to the input of temperature controller 23, with the other side of the input to this controller being connected in common with the armatures of the switches 20 and 21. The switches 20 and 21 are actuated by cams 27 and 28 secured 180° out of phase with each other on a shaft 29 which is connected to a timing motor 30 for controlled rotation.

The output of the temperature controller 23 is connected by a first line 31 and a switch 32 to a heating device 33 disposed in thermally connductive relationship with the grip 11 and by a second line 34 and a switch 35 to another heating device 36 disposed in thermally conductive relationship with the grip 12. The switches 32 and 35 are respectively controlled by a second pair of cams 37 and 38 secured 180° out of phase with respect to each other on the shaft 29. It can be seen from FIG. 1 that the cams 27, 28, 37, and 38 are arranged on the shaft 29 in such a way that the switches 20 and 32 are opened and closed simultaneously and in opposition to the concurrently simultaneous closure and opening of the switches 21 and 35.

The operation of the FIG. 1 embodiment will now be described. Assuming that switches 20 and 32 are closed and switches 21 and 35 are open, as shown in FIG. 1, then the input to the temperature controller 23 is a signal consisting of the difference between the voltages developed on thermocouples 16 and 17. Since these thermocouples are connected in series opposition, this voltage differential input to the temperature controller 23 represents the temperature differential, if any, existing between the locations on the test specimen 13 whereat the thermocouples 16 and 17 are attached.

The temperature controller 23 is of the kind which is known to the art and which produces an output power signal in response to the input temperature signal. The output power signal from the controller 23 can be a simple on-off power signal controlled by the presence or absence of a predetermined input signal, or the output power signal can have an amplitude proportional to the input signal and thus proportional to the amount of temperature differential measured by the selected pair of thermocouples. The output power signal travels through line 31 and switch 32 to the heating device 33, which may be an electrical resistance heating element wrapped or otherwise disposed around the grip 11. The heat from the heating device 33 raises the temperature of the grip, and by thermal conduction such heat also raises the temperature of the end of the test specimen 13 to which the thermocouple 17 is connected. The heating thus tends to minimize the temperature differential between the thermocouples 16 and 17; the temperature controller 23 accordingly reduces or completely eliminates the power output signal to the heating device 33 when this temperature differential is reduced to zero or to a minimum desirable threshold level, thus achieving feedback control of the temperature sensing-heating cycle.

It is apparent from the foregoing that only the thermal gradient of approximately half of the test specimen has been minimized thus far by the present invention. However, the timed rotation of the shaft 29 causes the switches 20 and 32 to open after a predetermined period and simultaneously causes the switches 21 and 35 to close. When this occurs, the input to the temperature controller 23 is a signal produced by the voltage differential across series-opposed thermocouples 16 and 18 and corresponding to the temperature differential across those two thermocouples. Correspondingly, the output of the temperature controller 23 now is connected through line 34 and switch 35 to the heating device 36 to supply heat to the grip 12 and the test specimen end with which the thermocouple 18 is associated. In this way, the thermal gradient across the other half of the test specimen 13 is eliminated or minimized.

The rate at which the temperature measuring input and heating power output of the temperature controller is switched between ends of the test specimen is not critical and is determined by the degree of accuracy with which it is desired to minimize or eliminate the thermal gradient across the test specimen. By way of example only, a cycling time of 30 seconds for each thermocouple pair and associated grip heating device, for a total period time of one minute, has been successfully used with the present invention. Moreover, it is within the scope of the present invention to have both of the thermocouple pairs 16, 17, and 16, 18 simultaneously operative to control the power to each of the respective heating device 33 and 36 for even more accurate control of the temperature across the test specimen.

Figure 2:
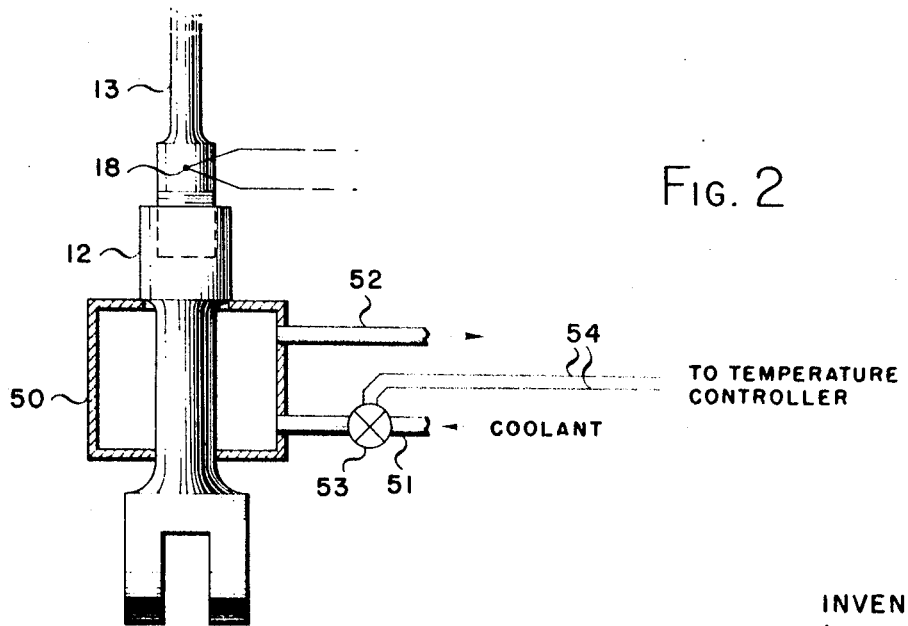
FIG. 2 shows in schematic form a portion of another embodiment of the invention.

A modified embodiment as shown in FIG. 2 can be used for tests conducted at sub-ambient temperatures where the testing machine grips act as a heat sink to maintain the ends of the test specimen 13 at some temperature greater than that of the sub-ambient atmosphere and present at the midpoint of the test specimen. The lower grip 12 of the testing machine is equipped with a suitable cooling device such as a coolant jacket 50 through which coolant supplied from a suitable source by way of a conduit 51 can flow to remove unwanted heat from the grip and an end of the test specimen. The coolant then exits the jacket through another conduit 52. A flow regulator valve 53 is electrically connected through lines 54 to the output of a suitable temperature controller, such as the controller 23 and the switch 35 of FIG. 1. A temperature differential sensed across that portion of the test specimen including the thermocouple 18 causes partial or complete opening of the flow regulator 52 to permit coolant to flow through the jacket 50 for removing unwanted heat from the grip 12 and the test specimen. While FIG. 2 shows only one grip and the associated cooling arrangement, it will be apparent that the other grip 11 is provided with a similar arrangement of cooling jacket and a controlled coolant supply.

It will be apparent that the invention described herein is adaptable to many mechanical test methods and specimens such as, for example, creep, stress rupture, compression, fatigue, and torsion testing. Moreover, the heating and cooling techniques are not limited to those exemplary techniques shown herein. Thus, induction heating or radiant heating are usable as alternatives for the resistance heating shown in FIG. 1. Other temperature measuring devices such as thermistors, pyrometers, or the like can be used instead of thermocouples, and the cam-controlled switches can be replaced with any suitable switching arrangement such as one employing solid-state elements.

What is claimed is:

1. Apparatus for minimizing an unwanted thermal gradient along a test specimen subjected to a non-ambient temperature, comprising:
    a first specimen holding means for engaging the test specimen at a first location thereon;
    a second specimen holding means for engaging the test specimen at a second location thereon;
    a first temperature adjusting means disposed in heat transfer relationship with said first specimen holding means;
    a second temperature adjusting means disposed in heat transfer relationship with said second specimen holding means;
    a first temperature measuring device responsive to the temperature of a test specimen first location adjacent said first specimen holding means;
    a second temperature measuring device responsive to the temperature of a test specimen second location adjacent said second specimen holding means;
    a third temperature measuring device responsive to the temperature of a test specimen third location intermediate of said first and second locations, so that the temperatures measured at said three locations indicate the thermal gradient existing on the specimen;
    temperature control means operative in response to an input indication of a thermal gradient on the test specimen to control said temperature adjusting means to reduce the magnitude of the thermal gradient;
    temperature signal switching means connected to receive the outputs of each of said temperature measuring devices,
    said temperature signal switching means being selectively operable to a first switched state to apply to said temperature control means an input signal corresponding to the difference between the measured temperatures at said first and third locations and to a second switched state to apply to said temperature control means an input signal corresponding to the difference between the measured temperatures at said second and third locations; and temperature control switching means operatively interrelated with said temperature signal switching means and connected to switch the output of said temperature control means to control said first temperature adjusting means during said first switched state and to control said second temperature adjusting means during said second switched state.

2. Apparatus as in claim 1, wherein:
each of said temperature adjusting means comprises heating means for supplying heat to the respective specimen holding member at the control of said temperature control means.

3. Apparatus as in claim 1, wherein:
each of said temperature adjusting means comprises cooling means for removing heat from the respective specimen holding member at the control of said temperature control means.

References Cited

UNITED STATES PATENTS

| | | | |
|---|---|---|---|
| 3,367,182 | 2/1968 | Baxter | 73—15 |
| 3,267,728 | 8/1966 | Solomons | 73—190 |
| 3,321,974 | 5/1967 | Sterbotzel | 73—359 |
| 3,365,944 | 1/1968 | Hoaglan et al. | 73—190 |

OTHER REFERENCES

West et al.: "Automatic Temperature Regulation and Recording in Precision Adiabatic Calorimetry" in Review of Scientific Instruments, vol. 28, #12, December 1957.

Sale: "Compression Tests of Structural Steel at Elevated Temperatures" in Journal of Research of N.B.S., vol. 13, 1934, pp. 723-725.

RICHARD C. QUEISSER, Primary Examiner

H. GOLDSTEIN, Assistant Examiner